(12) United States Patent
Fang et al.

(10) Patent No.: US 9,758,258 B2
(45) Date of Patent: Sep. 12, 2017

(54) ROTARY WING AIRCRAFT BLADE TRACKING

(71) Applicants: Austin Fang, Fairfield, CT (US);
Steven P. Lozano, Wolcott, CT (US)

(72) Inventors: Austin Fang, Fairfield, CT (US);
Steven P. Lozano, Wolcott, CT (US)

(73) Assignee: SIRKORSKY AIRCRAFT CORPORATION, Stratford, CT (US)

( * ) Notice: Subject to any disclaimer, the term of this patent is extended or adjusted under 35 U.S.C. 154(b) by 914 days.

(21) Appl. No.: 13/688,388

(22) Filed: Nov. 29, 2012

(65) Prior Publication Data

US 2014/0145025 A1 May 29, 2014

(51) Int. Cl.
*B64D 45/00* (2006.01)
*B64C 27/00* (2006.01)

(52) U.S. Cl.
CPC ............ *B64D 45/00* (2013.01); *B64C 27/008* (2013.01)

(58) Field of Classification Search
CPC .................................................. B64C 27/008
USPC ................................ 244/17.11, 17.13, 17.19
See application file for complete search history.

(56) References Cited

U.S. PATENT DOCUMENTS

| | | | | |
|---|---|---|---|---|
| 3,938,762 A * | 2/1976 | Murphy | ................ | B64C 27/001 244/17.13 |
| 4,362,281 A * | 12/1982 | Cresap | ................ | B64C 27/001 188/379 |
| 4,937,758 A * | 6/1990 | Hayden | ................ | B64C 27/001 244/17.11 |
| 6,322,324 B1 * | 11/2001 | Kennedy | ............... | B64C 27/001 244/17.13 |
| 6,415,206 B1 * | 7/2002 | Ventres | ................ | B64C 27/001 244/17.11 |
| 6,431,530 B1 * | 8/2002 | Stamps | ..................... | F16F 1/38 267/136 |
| 6,940,186 B2 * | 9/2005 | Weitkamp | .............. | F03D 7/042 290/44 |
| 7,719,416 B2 | 5/2010 | Arms et al. | | |
| 7,849,752 B2 | 12/2010 | Gregory et al. | | |
| 8,210,469 B2 * | 7/2012 | Nitzsche | ............... | B64C 27/001 244/17.11 |
| 2009/0277266 A1 * | 11/2009 | Wang | .................... | F03D 7/0224 73/514.01 |
| 2009/0324409 A1 * | 12/2009 | Volanthen | .............. | G01B 11/18 416/61 |
| 2011/0285578 A1 * | 11/2011 | Peczalski | ................ | G01S 13/42 342/127 |
| 2012/0078544 A1 * | 3/2012 | Lynch | .................. | B64C 27/008 702/56 |

\* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

A blade tracking system for a rotary wing aircraft includes a blade sensor mounted on a blade of the rotary wing aircraft, the blade sensor wirelessly transmitting blade data; a reference sensor mounted to the rotary wing aircraft, the blade driven by the rotor hub, the reference sensor transmitting reference data; and a processor receiving the blade data and the reference data, the processor determining at least one of lead-lag, flap and pitch of the blade in response to the blade data and the reference data.

20 Claims, 5 Drawing Sheets

ROTARY WING AIRCRAFT BLADE TRACKING

BACKGROUND

The subject matter disclosed herein relates generally to rotary wing aircraft, and in particular to tracking blades of a rotary wing aircraft.

Conventional methods for measuring blade track use optical camera equipment sensitive to visible and electromagnetic light wave spectra to detect contrast differences as blades block the background sky. The time difference between the leading and trailing edges of each blade pass is used to calculate blade track as well as lead/lag motions. Some of the shortcomings of conventional methods are the lack of reliable timing triggers due to low contrast differences between light colored blades and the background sky, along with increased rotor speed with reduced blade chord width. The low detection of lighter color blades works against the process of gathering blade track data. In addition, the blade track is only measured at one azimuthal location in the blade path above the optical camera.

SUMMARY

One embodiment includes a blade tracking system for a rotary wing aircraft, the system comprising a blade sensor mounted on a blade of the rotary wing aircraft, the blade sensor wirelessly transmitting blade data; a reference sensor mounted to the rotary wing aircraft, the blade driven by the rotor hub, the reference sensor transmitting reference data; and a processor receiving the blade data and the reference data, the processor determining at least one of lead-lag, flap and pitch of the blade in response to the blade data and the reference data.

Another embodiment is a rotary wing aircraft including an airframe; a rotor hub; a rotor blade driven by the rotor hub; a blade sensor mounted on the blade, the blade sensor wirelessly transmitting blade data; a reference sensor mounted to the rotary wing aircraft, the reference sensor transmitting reference data; and a processor receiving the blade data and the reference data, the processor determining at least one of lead-lag, flap and pitch of the blade in response to the blade data and the reference data. Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
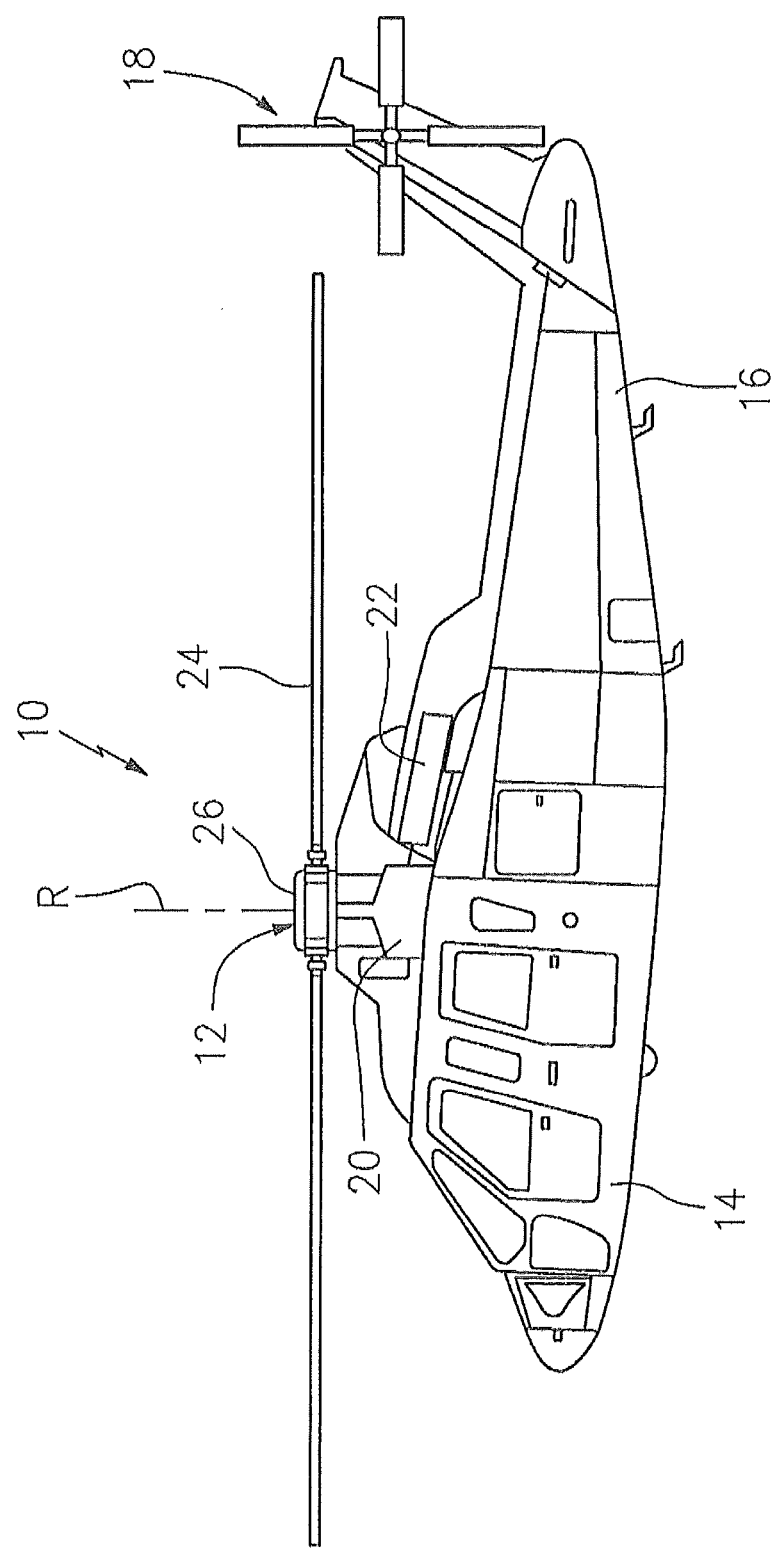
FIG. 1 depicts a rotary wing aircraft in an exemplary embodiment.

FIG. 1 illustrates a rotary wing aircraft 10 having a main rotor assembly 12 in an exemplary embodiment. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a plurality of rotor blades 24 mounted to a rotor hub 26. Although a particular rotary wing aircraft configuration is illustrated, other configurations and/or machines, such as high speed compound rotary wing aircraft with supplemental translational thrust systems, dual contra-rotating aircraft, coaxial rotor system aircraft, turbo-props, tilt-rotors and tilt-wing aircraft, will also benefit from embodiments of the invention.

Figure 2:
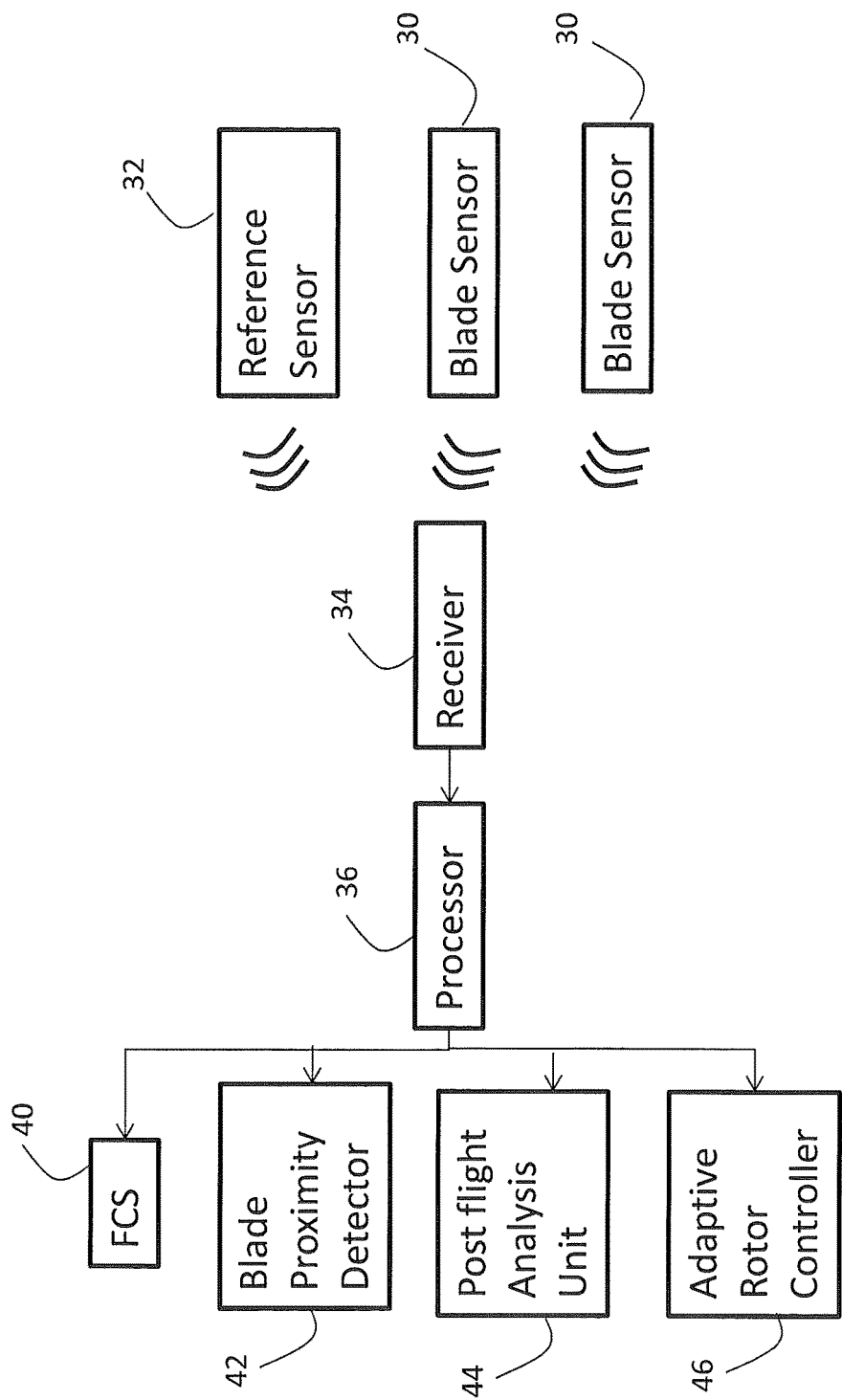
FIG. 2 depicts a blade tracking system in an exemplary embodiment.

FIG. 2 depicts a blade tracking system in an exemplary embodiment. One or more blades 24 include one or more blade sensors 30. Blade sensors 30 may be located along the span of a blade 24 to obtain blade data as the blade rotates. A reference sensor 32 is positioned in rotor hub 26 and provides reference data along with blade azimuth. The blade sensors 30 and reference sensor 32 wirelessly communicate with a receiver 34 that provides the blade data and reference data to processor 36. In alternative embodiments, reference sensor 32 may be wired to processor 36. The receiver 34 and processor 36 may be mounted on rotor hub 26 or in the non-rotating air-frame 14. Processor 36 may be implemented using a general-purpose microprocessor executing a computer program to perform the operations described herein. Processor 36 may be implemented using hardware (e.g., ASIC, FPGA, microcontroller) and/or a combination of hardware and software.

The blade sensors 30 and reference sensor 32 may be micro-electromechanical systems (MEMS) based sensors designed to be system-on-chips that have the ability for local processing of data and data transmission through wireless radio signals back to processor 36, via receiver 34. Exemplary MEMS embedded sensors include gyroscopes, accelerometers, magnetometers, pressure transducers, and strain gages, whose collective data from each of the locations is fused together by processor 36, along with known blade material properties, to accurately determine blade motion and position in nine degrees of freedom. In an exemplary embodiment, the degrees of freedom are three axis linear acceleration, three axis angular acceleration, and three axis of magnetic motion sensing.

Blade sensors 30 and reference sensor 32 may be powered by a battery positioned proximate the sensor. Alternatively, energy harvesting devices may be used to convert motion of the rotor hub/blades to electrical power. In other embodiments, the sensors may be line powered from a source delivered to the rotating frame.

Processor 36 executes methods to filter, combine, and process data from individual sensors. Blade data from blade sensors 30 and reference data from reference sensor 32 may be raw data or may be pre-processed data (i.e., pre-processed at the sensors). The methods also utilize blade properties determined from empirical testing for accurate blade stiffness in each of the degrees of freedom. Reference data from reference sensor 32 is used to provide the azimuth for the blades and provides a value to offset the data from blade sensors 30. For example, forces on the reference sensor 32 can be subtracted from the forces measured by blade sensors 30 to provide an absolute indication of forces on the blades 24. The output of processor 36 includes one or more blade parameters, such as blade position, lead/lag, flap, and pitch, at one or more locations along each blade 24 (e.g., the blade tip).

The blade parameters output by processor 36 may be used by one or more aircraft systems. A flight control system (FCS) 40 may use the blade parameters to adjust operation of the aircraft to improve flight characteristics (e.g., reduce blade vibration). A blade proximity detector 42 may use positional information of blades 24 to reduce likelihood of blade collision, in a dual rotor aircraft. The blade proximity determination is described in further detail with reference to FIG. 6. A post flight analysis unit 44 may use blade parameters for flight evaluation and scheduling of maintenance. An adaptive rotor controller 46 may use the blade parameters to adjust characteristics of one of more blades 24, in an aircraft that employs mission adaptive rotor blades.

Figure 3:
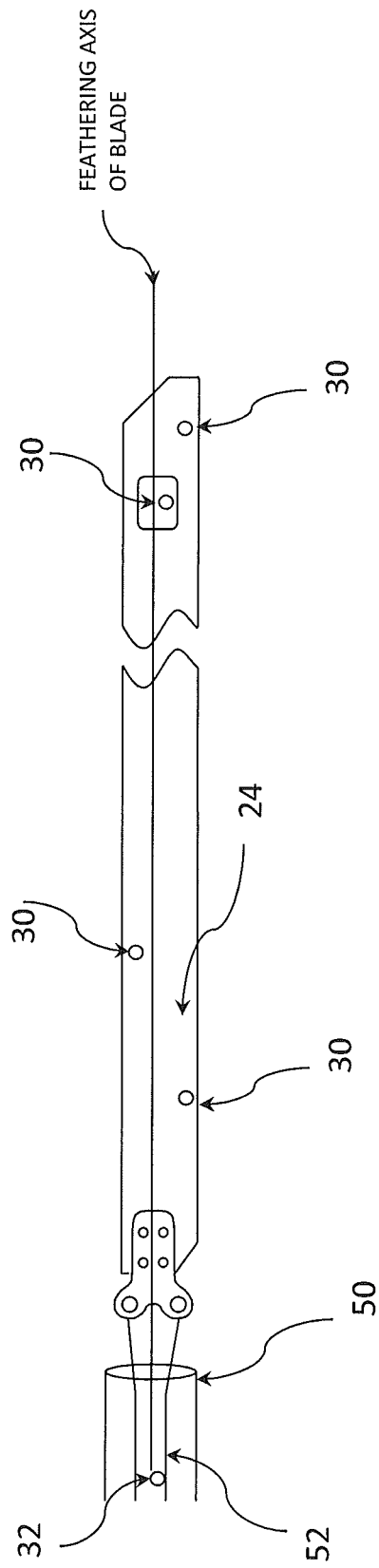
FIG. 3 depicts wireless sensors in a rotor blade in an exemplary embodiment.

FIG. 3 depicts wireless sensors in a rotor blade in an exemplary embodiment. In FIG. 3, reference sensor 32 is positioned in rotor arm hub 50. A blade spindle 52 supports blade 24. It is understood that reference sensor 32 may be positioned in a different portion of the rotor hub, and FIG. 3 depicts an exemplary embodiment. Blades sensors 30 are positioned at or more locations along blade 24. In exemplary embodiments, at least one blade sensor 30 is positioned proximate the tip of blade 24. In exemplary embodiments, blade sensors 30 are positioned on opposing sides of a longitudinal, feathering axis of blade 24. This arrangement facilitates detection of blade pitch.

Figure 4:
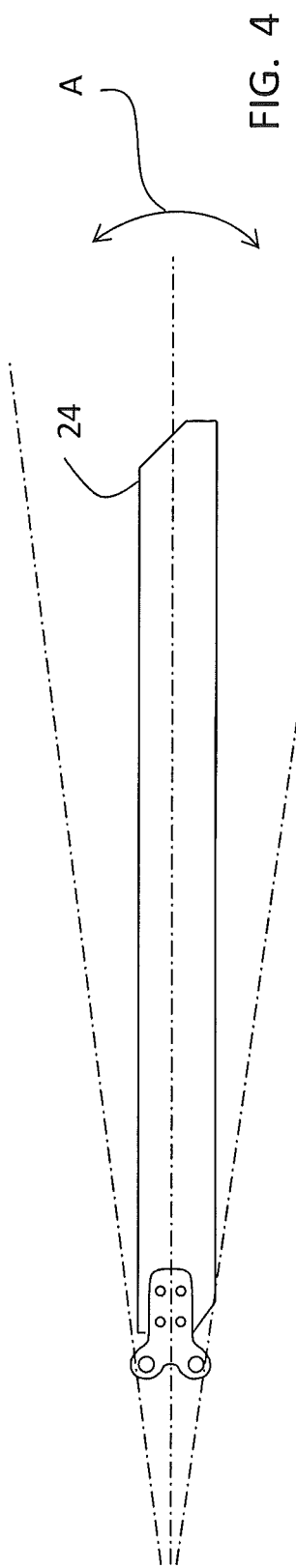
FIG. 4 is a top down view of a rotor blade in an exemplary embodiment.

FIG. 4 is a top down view of a rotor blade in an exemplary embodiment. FIG. 4 illustrates tracking of lead-lag of blade 24. The amount of lead-lag is represented as an angle, A, shown in FIG. 4. As noted above, by using the blade data from blade sensors 30 and reference data from reference sensor 32, the lead-lag for each blade 24 can be computed by processor 36.

Figure 5:
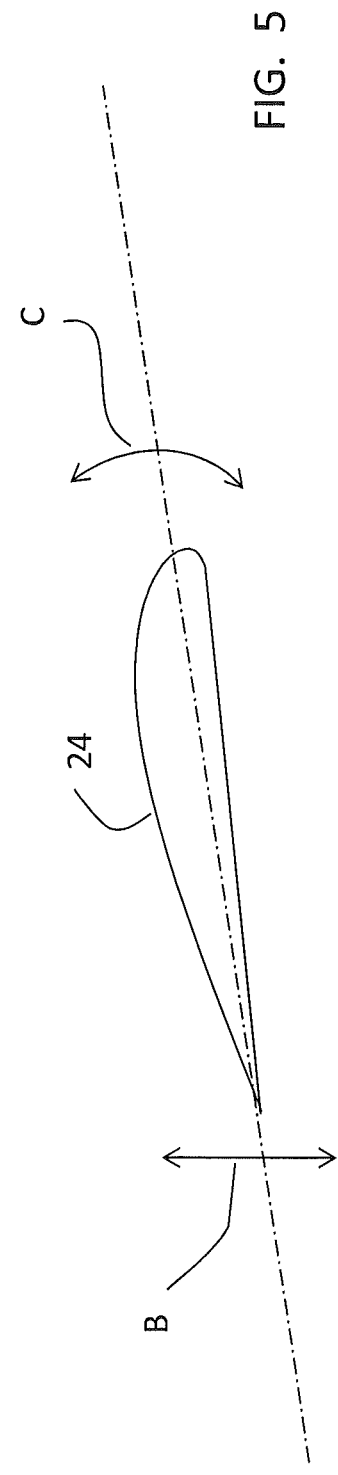
FIG. 5 is a tip view of a rotor blade in an exemplary embodiment.

FIG. 5 is a tip view of a rotor blade in an exemplary embodiment. FIG. 5 illustrates tracking of flap and pitch of blade 24. The amount of flap is represented as distance, B, shown in FIG. 5. The amount of blade pitch is represented as angle, C, shown in FIG. 5. As noted above, by using the blade data from blade sensors 30 and reference data from reference sensor 32, the flap and pitch for each blade 24 can be computed by processor 36.

Figure 6:
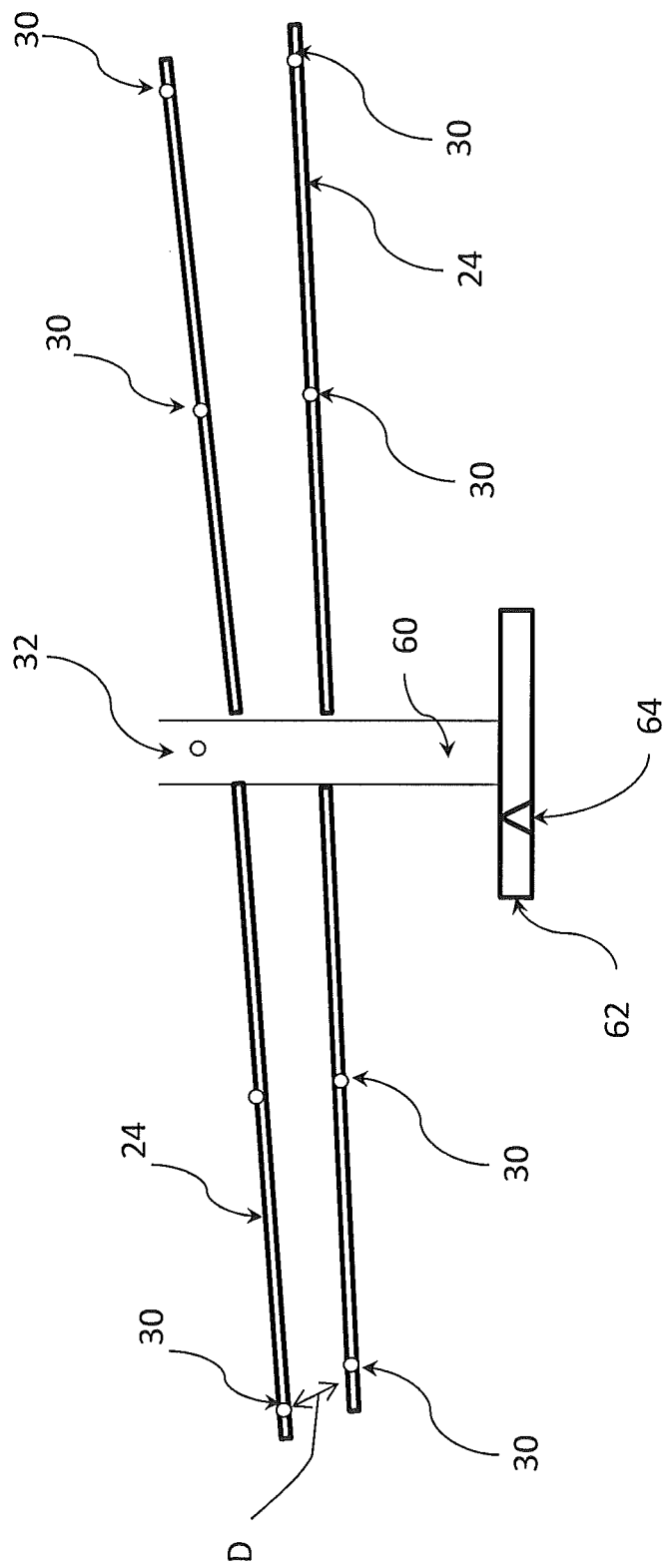
FIG. 6 depicts blade tracking for proximity detection in an exemplary embodiment.

FIG. 6 depicts blade tracking for proximity detection in an exemplary embodiment. In FIG. 6, the rotary wing aircraft includes two, counter rotating blades 24. In such aircraft, it is desirable to detect if the tips of blades 24 are in threat of coming in contact. Blades 24 include one or more blade sensors 30, as described above. Reference sensor 32 is mounted to the rotor hub, on the rotor shaft 60. A tachometer 64 is mounted, for example, to swashplate 62.

Processor 36 uses the blade data from blade sensors 30, reference data from reference sensor 32 and a tachometer signal from tachometer 64 to determine a distance, D, between the upper and lower rotor blades 24 upon crossing. The tachometer signal is used to determine when the blades 24 cross each other (e.g., rotation phasing). The blade data and reference data are used to compute the distance between blade tips upon crossing.

Processor 36 or blade proximity detector 42 may compute distance D. In one embodiment, processor 36 computes distance, D, between blades at crossing and outputs the distance to blade proximity detector 42 for analysis and corrective action, if necessary. In alternate embodiments, processor 36 forwards blade data, reference data and tachometer signal to blade proximity detector 42 to compute distance, D. A direction cosine matrix and quaternions may be generated from the blade data and reference data to calculate orientation and rotation of the blades 24 in three dimensions. Together with geometric constraints, the distance, D, between the upper and lower blades 24 is derived.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A blade tracking system for a rotary wing aircraft, the system comprising:
   a plurality of blade sensors mounted directly on and over a span of a blade of the rotary wing aircraft, the blade sensor wirelessly transmitting blade data, the plurality of blade sensors being capable of performing local processing of data;
   a reference sensor mounted to a rotating rotor hub of the rotary wing aircraft, the blade driven by the rotor hub, the reference sensor transmitting reference data; and
   a processor receiving the blade data and the reference data, the processor determining at least one of lead-lag, flap and pitch of the blade in response to the blade data and the reference data.

2. The blade tracking system of claim 1 wherein:
   the reference sensor wirelessly transmits the reference data.

3. The blade tracking system of claim 1 wherein:
   the plurality of blade sensors wirelessly transmit raw data as the blade data.

4. The blade tracking system of claim 1 wherein:
   the plurality of blade sensors wirelessly transmit preprocessed data as the blade data.

5. The blade tracking system of claim 1 wherein:
   the at least one of lead-lag, flap and pitch of the blade is determined for a tip of the blade.

6. The blade tracking system of claim 1 wherein:
   the blade data indicates blade motion in nine degrees of freedom.

7. The blade tracking system of claim 6 wherein:
   the nine degrees of freedom include three axis linear acceleration, three axis angular acceleration, and three axis magnetic motion sensing.

8. The blade tracking system of claim 1 further comprising:
   at least one second blade sensor mounted on a second blade of the rotary wing aircraft, the at least one second blade sensor wirelessly transmitting second blade data.

9. The blade tracking system of claim 8 further comprising:
   a tachometer generating a tachometer signal indicative of rotation phasing of a rotor hub.

10. The blade tracking system of claim 9 wherein:
    the processor computes a distance between the blade and the second blade in response to the blade data, second blade data, reference data and tachometer signal.

11. A rotary wing aircraft comprising:
    an airframe;
    a rotating rotor hub;

a rotor blade driven by the rotor hub;
a plurality of blade sensors mounted directly on and across a span of the blade, the blade sensor wirelessly transmitting blade data, the plurality of blade sensors being capable of performing local processing of data;
a reference sensor mounted to the rotor hub, the reference sensor transmitting reference data; and
a processor receiving the blade data and the reference data, the processor determining at least one of lead-lag, flap and pitch of the blade in response to the blade data and the reference data.

12. The rotary wing aircraft of claim 11 wherein:
the reference sensor wirelessly transmits the reference data.

13. The rotary wing aircraft of claim 11 wherein:
the plurality of blade sensors wirelessly transmits raw data as the blade data.

14. The rotary wing aircraft of claim 11 wherein:
the plurality of blade sensor wirelessly transmits preprocessed data as the blade data.

15. The rotary wing aircraft of claim 11 wherein:
the at least one of lead-lag, flap and pitch of the blade is determined for a tip of the blade.

16. The rotary wing aircraft of claim 11 wherein:
the blade data indicates blade motion in nine degrees of freedom.

17. The rotary wing aircraft of claim 16 wherein:
the nine degrees of freedom include three axis linear acceleration, three axis angular acceleration, and three axis magnetic motion sensing.

18. The rotary wing aircraft of claim 11 further comprising:
at least one second blade sensor mounted on a second blade of the rotary wing aircraft, the at least one second blade sensor wirelessly transmitting second blade data.

19. The rotary wing aircraft of claim 18 further comprising:
a tachometer generating a tachometer signal indicative of rotation phasing of a rotor hub.

20. The rotary wing aircraft of claim 19 wherein:
the processor computes a distance between the blade and the second blade in response to the blade data, second blade data, reference data and tachometer signal.

* * * * *